(12) United States Patent
Donoso

(10) Patent No.: US 10,690,308 B2
(45) Date of Patent: Jun. 23, 2020

(54) AUTOMOTIVE LIGHTING DEVICE

(71) Applicant: VALEO ILUMINACION, Martos (ES)

(72) Inventor: Sergio Donoso, Martos (ES)

(73) Assignee: VALEO ILUMINACION, Martos (ES)

( * ) Notice: Subject to any disclaimer, the term of this patent is extended or adjusted under 35 U.S.C. 154(b) by 0 days.

(21) Appl. No.: 16/440,160

(22) Filed: Jun. 13, 2019

(65) Prior Publication Data

US 2019/0383457 A1 Dec. 19, 2019

(30) Foreign Application Priority Data

Jun. 13, 2018 (EP) ..................................... 18382420

(51) Int. Cl.
| | |
|---|---|
| *F21S 41/255* | (2018.01) |
| *F21S 41/275* | (2018.01) |
| *F21S 41/30* | (2018.01) |
| *B60Q 1/04* | (2006.01) |
| *F21S 41/43* | (2018.01) |

(52) U.S. Cl.
CPC .............. *F21S 41/255* (2018.01); *B60Q 1/04* (2013.01); *F21S 41/275* (2018.01); *F21S 41/30* (2018.01); *F21S 41/43* (2018.01)

(58) Field of Classification Search
CPC ........ F21S 41/255; F21S 41/275; F21S 41/30; F21S 41/43; F21S 1/04; B60Q 1/04
See application file for complete search history.

(56) References Cited

U.S. PATENT DOCUMENTS

2010/0172146 A1    7/2010  Fischer

FOREIGN PATENT DOCUMENTS

| DE | 20 2005 004 080 U1 | 8/2005 |
| EP | 1 980 787 A1 | 10/2008 |
| GB | 2 248 493 | 4/1992 |
| KR | 10-2015-0131787 | 11/2015 |
| WO | WO 2015/031924 A1 | 3/2015 |

OTHER PUBLICATIONS

European Search Report dated Nov. 13, 2018 in European Application 18382420.0 filed on Jun. 13, 2018.

*Primary Examiner* — Thomas M Sember
(74) *Attorney, Agent, or Firm* — Oblon, McClelland, Maier & Neustadt, L.L.P.

(57) ABSTRACT

An automotive lighting device includes a low beam light source, adapted for emitting a low beam and a signlight beam, a diaphragm element and a main optical element. The main optical element includes a first zone and a second zone. The first zone is suitable for receiving a part of the low beam which has not been reflected by the diaphragm element and projecting a low beam pattern and the second zone is suitable for receiving a part of the signlight beam which has not been reflected by the diaphragm element and projecting a signlight pattern. At least part of the second zone of the main optical element is treated to provide light diffusion.

20 Claims, 2 Drawing Sheets

AUTOMOTIVE LIGHTING DEVICE

TECHNICAL FIELD

The present invention belongs to the field of lamps for automotive vehicles, and more specifically, to the design of headlamps providing a low beam and a signlight beam.

STATE OF THE ART

Among the set of regulations that a lighting device must fulfil, there are some regulations related to the signlight beam. This signlight beam is part of the low beam which is in charge of providing some light so that the driver is able to see signs which are above his head.

This signlight beam should therefore be powerful enough to enable this vision but low enough not to glare objects or people that may come across the vehicle.

The frontier between the low beam and the signlight beam is usually achieved by a folder, which only allows a few rays to pass over the cut-off line defining the low beam. As a consequence, the signlight beam is not very homogeneous.

A way of improving the homogeneity of this signlight beam is therefore sought.

DESCRIPTION OF THE INVENTION

The invention provides a solution for this problem by the provision of an automotive lighting device according to claim 1. Preferred embodiments of the invention are defined in dependent claims.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

In a first inventive aspect, the invention provides an automotive lighting device comprising
- at least a low beam light source, adapted for emitting a low beam and a signlight beam,
- a diaphragm element with a front edge, the diaphragm element being arranged for receiving and reflecting at least part of the low beam and the signlight beam,
- a main optical element with a first zone and a second zone, the first zone being suitable for receiving a part of the low beam which has not been reflected by the diaphragm element and projecting a low beam pattern and the second zone being suitable for receiving a part of the signlight beam which has not been reflected by the diaphragm element and projecting a signlight pattern, wherein at least part of the second zone of the main optical element is treated to provide light diffusion.

The low beam rays corresponding to the front edge of the diaphragm element must be construed as the low beam rays resulting from a limit angle of projection of the low beam light source below which the primary low beam is reflected by the diaphragm element.

This lighting device achieves a more homogeneous pattern for the signlight beams which are projected by the second zone of the main optical element.

In some particular embodiments, at least part of the second zone of the main optical element is superficially treated to provide light diffusion.

This surface treatment is easy to apply and provides the required light diffusion, thus improving the homogeneity of the signlight beams projected by this second zone of the main optical element.

In some particular embodiments, the surface treatment comprises graining.

Graining is a particularly advantageous example of surface treatment, which is easy to apply and offers good results in improving the homogeneity of the signlight beam.

In some particular embodiments, the second zone comprises an internal face and an external face, the internal face being closer to the diaphragm element (3) than the external face, and the at least part of the second zone which is superficially treated is located on the internal face. In different embodiments, this treatment is located on the external face. This surface treatment may be applied in any of the faces of the main optical element. This choice will depend on the particular treatment and the manufacturing process.

In some particular embodiments, the whole second zone of the main optical element is treated.

Although the treatment may be applied in just part of the second zone, the application in the whole second zone offers a better outcome.

In some particular embodiments, the low beam light source comprises a solid-state light source and a primary optical element.

The term "solid state" refers to light emitted by solid-state electroluminescence, which uses semiconductors to convert electricity into light. Compared to incandescent lighting, solid state lighting creates visible light with reduced heat generation and less energy dissipation. The typically small mass of a solid-state electronic lighting device provides for greater resistance to shock and vibration compared to brittle glass tubes/bulbs and long, thin filament wires. They also eliminate filament evaporation, potentially increasing the life span of the illumination device. Some examples of these types of lighting comprise semiconductor light-emitting diodes (LEDs), organic light-emitting diodes (OLED), or polymer light-emitting diodes (PLED) as sources of illumination rather than electrical filaments, plasma or gas.

The primary optical element is intended to project a first low beam pattern and a first signlight beam pattern which is suitable for being projected by the main optical element.

In some particular embodiments, the primary optical element is a collimator. A collimator provides an optimal optical behaviour for this application. The collimator is able to transform the divergent beams of light coming from a unique light source into a parallel distribution of light beams.

In some particular embodiments, the main optical element is an outer lens. The outer lens of an automotive lighting device may perform this function, in such a way that no more additional parts are needed.

In some particular embodiments, the diaphragm element is an opaque folder. Alternatively, the diaphragm element is an element having a transparent surface, such as light guide, the transparent surface playing the role of diaphragm falling back on the principle of total internal reflection. The diaphragm element does not need to be an opaque element, but just adapted for reflecting at least part of the secondary low beam (such as a transparent element intended for reflecting light by total internal reflection).

In some particular embodiments, the automotive lighting device further comprises a high beam module.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures.

DETAILED DESCRIPTION OF THE INVENTION

Figure 1:
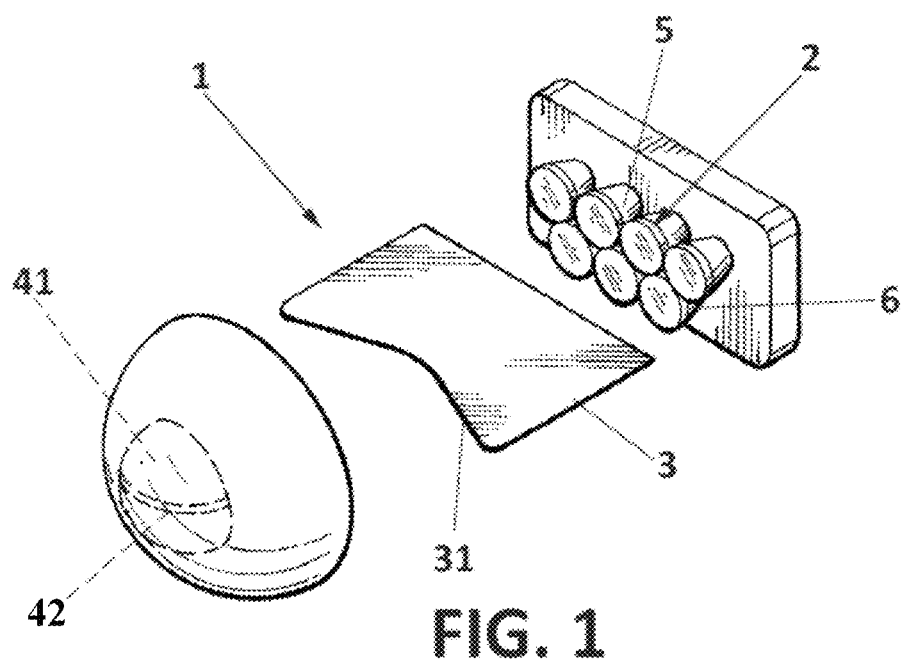
FIG. 1 shows an automotive lighting device according to the invention

The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

FIG. 1 shows an automotive lighting device 1 according to the invention, which comprises the following elements:
a low beam light source 2;
a folder 3 with a front edge 31;
an outer lens 4; and
a high beam module 6.

The low beam light source 2 shown in this figure is adapted to emit a low beam and a signlight beam.

The folder 3 comprises a front edge 31. This folder 3 is arranged for receiving and reflecting at least part of the low beam and the signlight beam. The front edge 31 is in charge of creating a cut-off line which defines the shape and size of these light beams according to the regulations.

The outer lens 4 comprises a first zone 41 and a second zone 42. The first zone 41 is suitable for receiving a part of the low beam which has not been reflected by the folder 3 and projecting a low beam pattern. The second zone 42 is in turn suitable for receiving a part of the signlight beam which has not been reflected by the folder 3 and projecting a signlight pattern.

In this case, the whole second zone 42 has received a graining treatment in the outer surface of the lens.

In order to achieve its aim, the low beam light source 2 comprises a plurality of LEDs and a collimator 5.

Figure 2A:
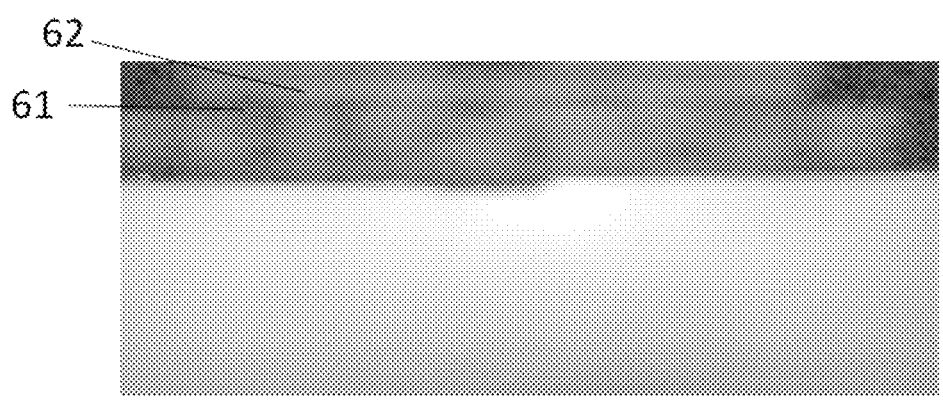
FIGS. 2a and 2b shows a comparison between the effect of a lighting device according to the invention and the effect of a lighting device according to the state of the art.
Figure 2B:

FIGS. 2a and 2b shows a comparison between the effect of a lighting device according to the invention and the effect of a lighting device according to the state of the art.

FIG. 2a shows a light map of the signlight projected by an automotive lighting device according to the state of the art. It shows several light bands 61 which are intended to light the signs which are on the road. Between the light bands, there are dark bands 62 which provide a lower luminous intensity.

FIG. 2b shows the same light map but belonging to the signlight projected by an automotive lighting device according to the invention. It also comprises light bands 61', but the dark zones 62' between each light band 61' have been blurred due to the surface treatment in the outer lens, so a more continuous light pattern is obtained.

Figure 3:
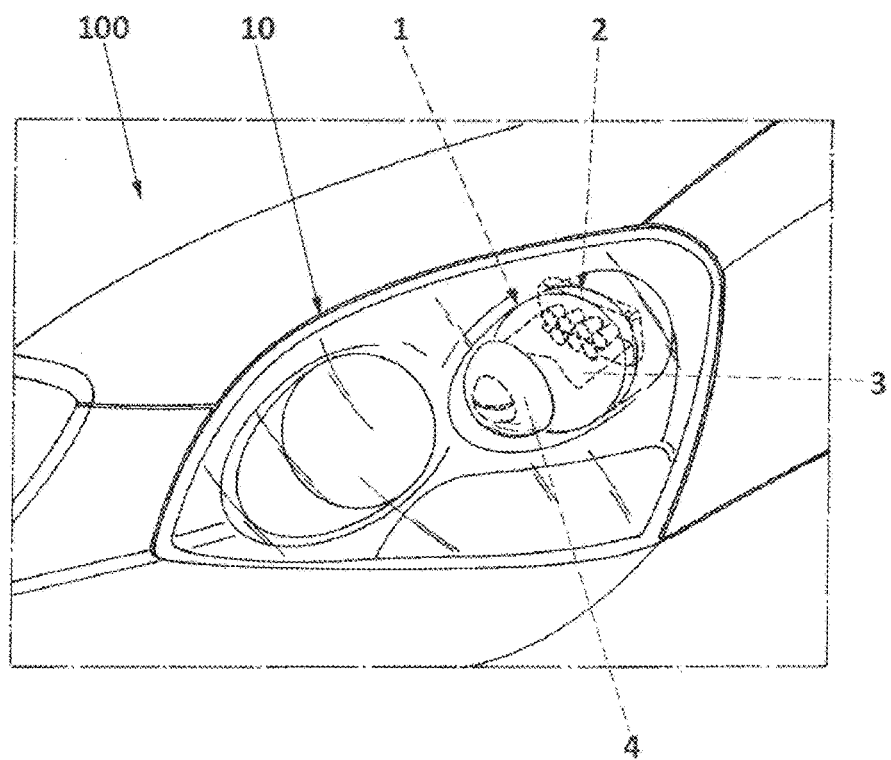
FIG. 3 shows a lighting device according to the invention which has been installed in an automotive vehicle.

FIG. 3 shows a lighting device 1 according to the invention which has been installed in an automotive vehicle 100.

Such a lighting device is able to fulfil the lighting requirements, and also provides a better signlight pattern without major modifications affecting the size or the internal components of such a lighting device. As a consequence, this improvement may be incorporated into existing lighting devices.

The invention claimed is:

1. An automotive lighting device, comprising:
    a low beam light source to emit a low beam and emit a signlight beam,
    a diaphragm element with a front edge, the diaphragm element being arranged to receive and reflect at least part of the low beam and the signlight beam,
    a main optical element with a first zone and a second zone, the first zone to receive a part of the low beam that has not been reflected and project a low beam pattern, and the second zone to receive a part of the signlight beam that has not been reflected and project a signlight pattern,
    wherein at least part of the second zone of the main optical element is treated to provide light diffusion; and
    the second zone is immediately adjacent to and below the first zone.

2. The automotive lighting device according to claim 1, wherein at least part of the second zone of the main optical element has been superficially treated to provide light diffusion; and
    the second zone is immediately adjacent to and below the first zone.

3. The automotive lighting device according to claim 2, wherein the at least part of the second zone has undergone graining.

4. The automotive lighting device according to claim 3, wherein the second zone comprises an internal face and an external face, the internal face being closer to the diaphragm element than the external face, and the at least part of the second zone which has been superficially treated is located on the internal face.

5. The automotive lighting device according to claim 3, wherein the second zone comprises an internal face and an external face, the internal face being closer to the diaphragm element than the external face, and the at least part of the second zone which has been superficially treated is located on the external face.

6. The automotive lighting device according to claim 3, wherein the whole second zone of the main optical element has been treated.

7. The automotive lighting device according to claim 3, wherein the low beam light source comprises a solid-state light source and a primary optical element.

8. The automotive lighting device according to claim 2, wherein the second zone comprises an internal face and an external face, the internal face being closer to the diaphragm element than the external face, and the at least part of the second zone which has been superficially treated is located on the internal face.

9. The automotive lighting device according to claim 2, wherein the second zone comprises an internal face and an external face, the internal face being closer to the diaphragm element than the external face, and the at least part of the second zone which has been superficially treated is located on the external face.

10. The automotive lighting device according to claim 2, wherein the whole second zone of the main optical element has been treated.

11. The automotive lighting device according to claim 2, wherein the low beam light source comprises a solid-state light source and a primary optical element.

12. The automotive lighting device according to claim 2, wherein the main optical element is an outer lens.

13. The automotive lighting device according to claim 2, wherein the diaphragm element is an opaque folder or an optical element having a transparent surface.

14. The automotive lighting device according to claim 2, further comprising a high beam module.

15. The automotive lighting device according to claim 1, wherein the whole second zone of the main optical element has been treated.

16. The automotive lighting device according to claim 1, wherein the low beam light source comprises a solid-state light source and a primary optical element.

17. The automotive lighting device according to claim 16, wherein the primary optical element is a collimator.

18. The automotive lighting device according to claim 1, wherein the main optical element is an outer lens.

19. The automotive lighting device according to claim 1, wherein the diaphragm element is an opaque folder or an optical element having a transparent surface.

20. The automotive lighting device according to claim 1, further comprising a high beam module.

* * * * *